United States Patent
Lai et al.

(10) Patent No.: US 11,030,764 B2
(45) Date of Patent: Jun. 8, 2021

(54) METHOD AND SYSTEM FOR TRAILER SIZE ESTIMATING AND MONITORING

(71) Applicants: DENSO International America, Inc., Southfield, MI (US); DENSO CORPORATION, Kariya (JP)

(72) Inventors: Ting-Yu Lai, Northville, MI (US); Miki Sato, Novi, MI (US); Markos Gerges, Sterling Heights, MI (US)

(73) Assignees: DENSO INTERNATIONAL AMERICA, INC., Southfield, MI (US); DENSO CORPORATION, Kariya (JP)

( * ) Notice: Subject to any disclaimer, the term of this patent is extended or adjusted under 35 U.S.C. 154(b) by 104 days.

(21) Appl. No.: 16/204,789

(22) Filed: Nov. 29, 2018

(65) Prior Publication Data

US 2020/0175709 A1 Jun. 4, 2020

(51) Int. Cl.
*G06T 7/62* (2017.01)
*G06K 9/46* (2006.01)
*G06K 9/00* (2006.01)

(52) U.S. Cl.
CPC ............ *G06T 7/62* (2017.01); *G06K 9/00791* (2013.01); *G06K 9/4642* (2013.01); *G06T 2207/30252* (2013.01)

(58) Field of Classification Search
CPC ......... G01S 13/931; G01S 2013/93272; G01S 2013/93274; G01S 13/726; G01S 2013/932; G01S 2015/932; G01S 7/521; G01S 13/282; G01S 2013/9314; G01S 2013/9315; G01S 17/931; G01S 2013/93271; G08G 1/0962; G08G 1/168; G08G 1/042; G08G 1/20; G08G 1/167; B60R 1/00; B60R 21/213; B60R 21/01542; B60R 21/01552; B60R 2021/01315; B60R 2300/8073; B60W 2300/14; B60W 2520/22; B60W 50/14; B60W 2554/803; B60W 30/02;

(Continued)

(56) References Cited

U.S. PATENT DOCUMENTS 6,434,486 B1    8/2002   Studt et al.
6,687,609 B2 *   2/2004   Hsiao ............... G01C 21/26
                                                    340/993

(Continued)

FOREIGN PATENT DOCUMENTS

CN           107272021 A     10/2017

*Primary Examiner* — Santiago Garcia
(74) *Attorney, Agent, or Firm* — Brooks Kushman, P.C.

(57) ABSTRACT

A vehicle system for estimating a trailer size may include a plurality of sensors arranged on a vehicle and may be configured to detect objects external to the vehicle and provide trailer data indicative of a trailer location behind a vehicle and a memory configured to maintain a virtual grid including a plurality of cells. The system may also include a controller in communication with the sensors and memory and configured to determine, based on the trailer data received within a predefined amount of time, an occupancy frequency for each of the plurality of cells, the occupancy frequency being an incrementation of each time an object was detected within the respective cell; determine a threshold distribution based on the occupancy frequency of each cell; and determine a trailer size based on the cells having an occupancy frequency exceeding the threshold distribution.

17 Claims, 5 Drawing Sheets

(58) Field of Classification Search
CPC .......... B60W 2530/14; B60W 50/0098; B60K 31/0008; B60T 2201/08; H01Q 21/0087; B60N 2002/0272; G05D 2201/0213; E05Y 2900/516; E05Y 2900/50; B60Q 2300/41; E05F 15/431; G01B 11/005; F02D 2200/701; F02D 41/0215; F16H 2061/0223; G06K 9/00791; G06K 9/3241; G06K 9/6256; G06K 9/00335; G06K 9/0061; G06K 9/036; G06K 9/52; G06T 2207/30252; G06T 7/74; H04N 5/23238; G06F 3/011
USPC ................. 382/103; 342/27, 54, 70
See application file for complete search history.

(56) References Cited

U.S. PATENT DOCUMENTS

| | | | |
|---|---|---|---|
| 6,784,828 B2 * | 8/2004 | Delcheccolo | G01S 7/354 342/70 |
| 7,786,849 B2 | 8/2010 | Buckley | |
| 7,983,817 B2 * | 7/2011 | Breed | B60N 2/0232 701/45 |
| 8,744,744 B2 | 6/2014 | Takagi | |
| 9,211,889 B1 | 12/2015 | Hoetzer et al. | |
| 9,594,155 B2 | 3/2017 | Cashler et al. | |
| 9,802,542 B2 | 10/2017 | Lu et al. | |
| 9,937,861 B2 | 4/2018 | Shehan et al. | |
| 2002/0067287 A1 * | 6/2002 | Delcheccolo | H01Q 21/0087 340/901 |
| 2002/0147534 A1 * | 10/2002 | Delcheccolo | H01Q 1/38 701/45 |
| 2004/0056778 A1 * | 3/2004 | Hilliard | G08G 1/042 340/933 |
| 2007/0182528 A1 * | 8/2007 | Breed | B60Q 9/008 340/435 |
| 2010/0066587 A1 | 3/2010 | Yamauchi et al. | |
| 2011/0181457 A1 | 7/2011 | Basten | |
| 2015/0369618 A1 * | 12/2015 | Barnard | H04W 4/70 701/491 |
| 2016/0252610 A1 | 9/2016 | Smith et al. | |
| 2017/0140645 A1 * | 5/2017 | Balid | H04W 4/40 |
| 2017/0285161 A1 | 10/2017 | Izzat et al. | |
| 2017/0297563 A1 * | 10/2017 | Kava | B60W 10/11 |
| 2017/0305436 A1 * | 10/2017 | Maskell | B60W 30/02 |
| 2017/0363727 A1 | 12/2017 | Prasad et al. | |
| 2019/0294889 A1 * | 9/2019 | Sriram | G06K 9/00335 |

* cited by examiner

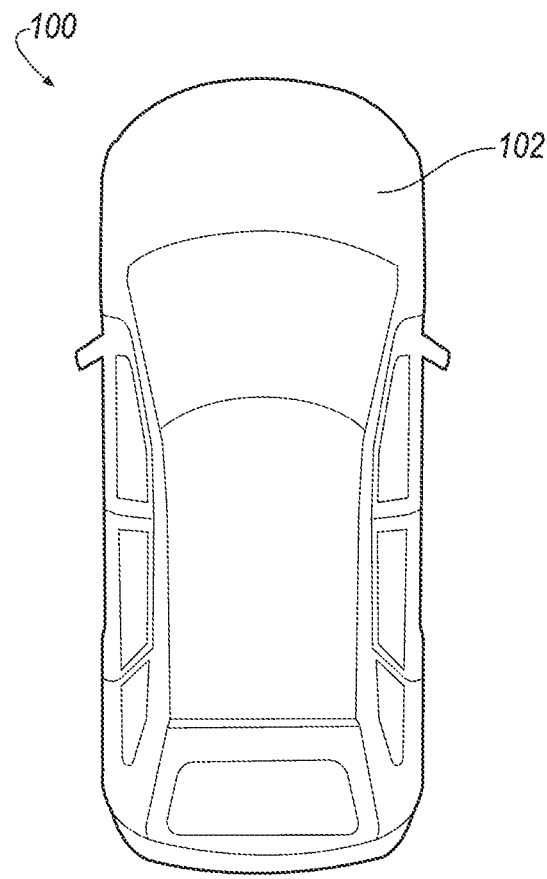
FIG. 2A
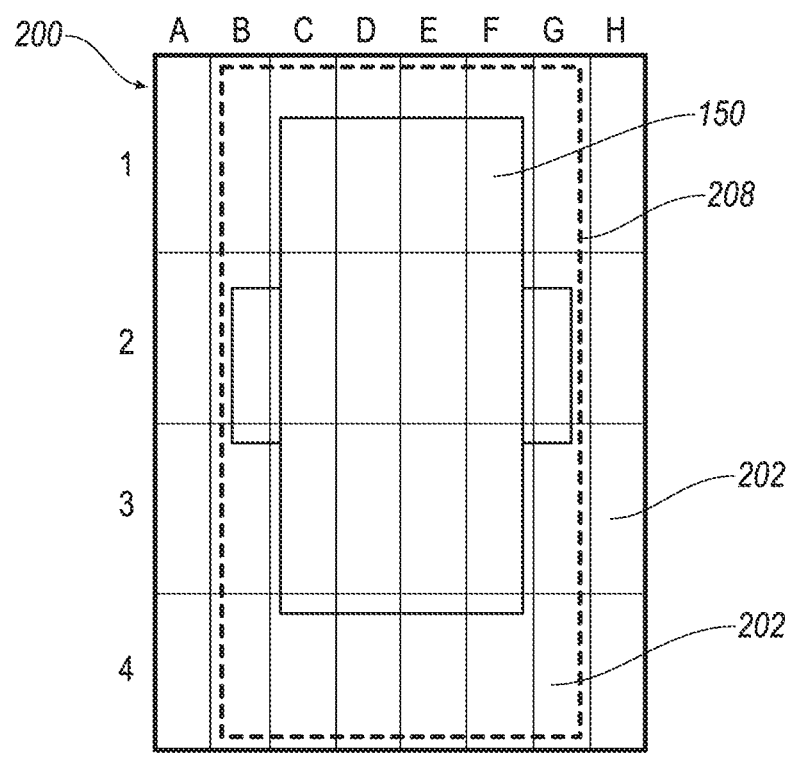

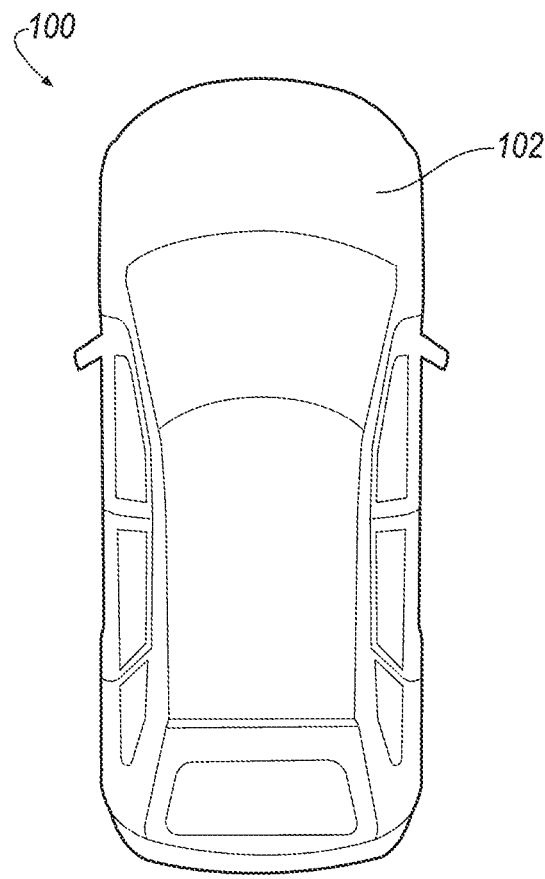
FIG. 2B
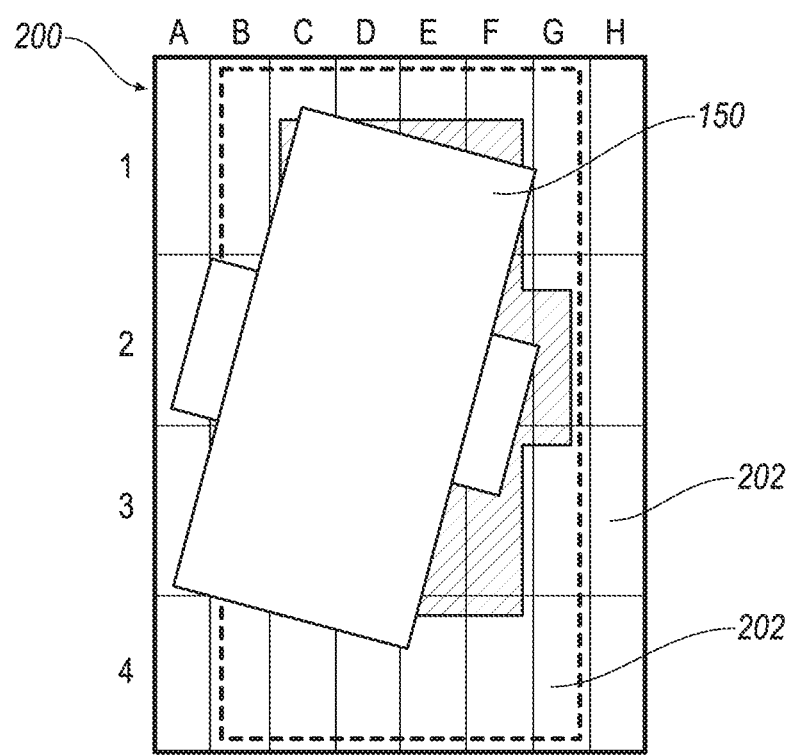

METHOD AND SYSTEM FOR TRAILER SIZE ESTIMATING AND MONITORING

TECHNICAL FIELD

The present disclosure relates to methods and systems for trailer size estimating and monitoring.

BACKGROUND

In connection with vehicle advanced driver assistance systems (ADAS), vehicles include various sensors within and on the exterior of the vehicle. These sensors may provide data that may be used by various vehicle systems to provide features to the user. These features may include park assist, bird-eye views, pedestrian protection systems, as well as especially Blind Spot Monitor (BSM), Lane Departure Warning (LDW), and Lane Change Assist (LCA). However, these features may be less accurate or disabled in the event that a trailer is attached to the vehicle.

SUMMARY

A vehicle system for estimating a trailer size may include a plurality of sensors arranged on a vehicle and configured to detect objects external to the vehicle and provide trailer data indicative of a trailer location behind a vehicle and a memory configured to maintain a virtual grid including a plurality of cells. The system may also include a controller in communication with the sensors and memory and configured to determine, based on the trailer data received within a predefined amount of time, an occupancy frequency for each of the plurality of cells, the occupancy frequency being an incrementation of each time an object was detected within the respective cell; determine a threshold distribution based on the occupancy frequency of each cell; and determine a trailer size based on the cells having an occupancy frequency exceeding the threshold distribution.

A non-transitory computer-readable medium tangibly embodying computer readable instructions for a software program, the software program being executable by a processor of a computing device to provide operations may include receiving trailer data indicative of a trailer position behind a vehicle; generating a virtual grid having a plurality of cells, each having a continually updated occupancy frequency based on the trailer data; determining a threshold distribution between the occupancy frequencies of the cells based on the occupancy frequency of each cell; and determine a trailer size based on the cells having an occupancy frequency exceeding the threshold distribution.

A method may include receiving trailer data indicative of a trailer position behind a vehicle; generating a virtual grid having a plurality of cells, each having a continually updated occupancy frequency based on the trailer data; determining a threshold distribution between the occupancy frequencies of the cells based on the occupancy frequency of each cell; and determine a trailer size based on the cells having an occupancy frequency exceeding the threshold distribution.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 2A illustrates an example top view of the trailer system with the trailer in a first position;

FIG. 2B illustrates an example top view of the trailer system with the trailer in a second, off-set position;

DETAILED DESCRIPTION

Figure 1:
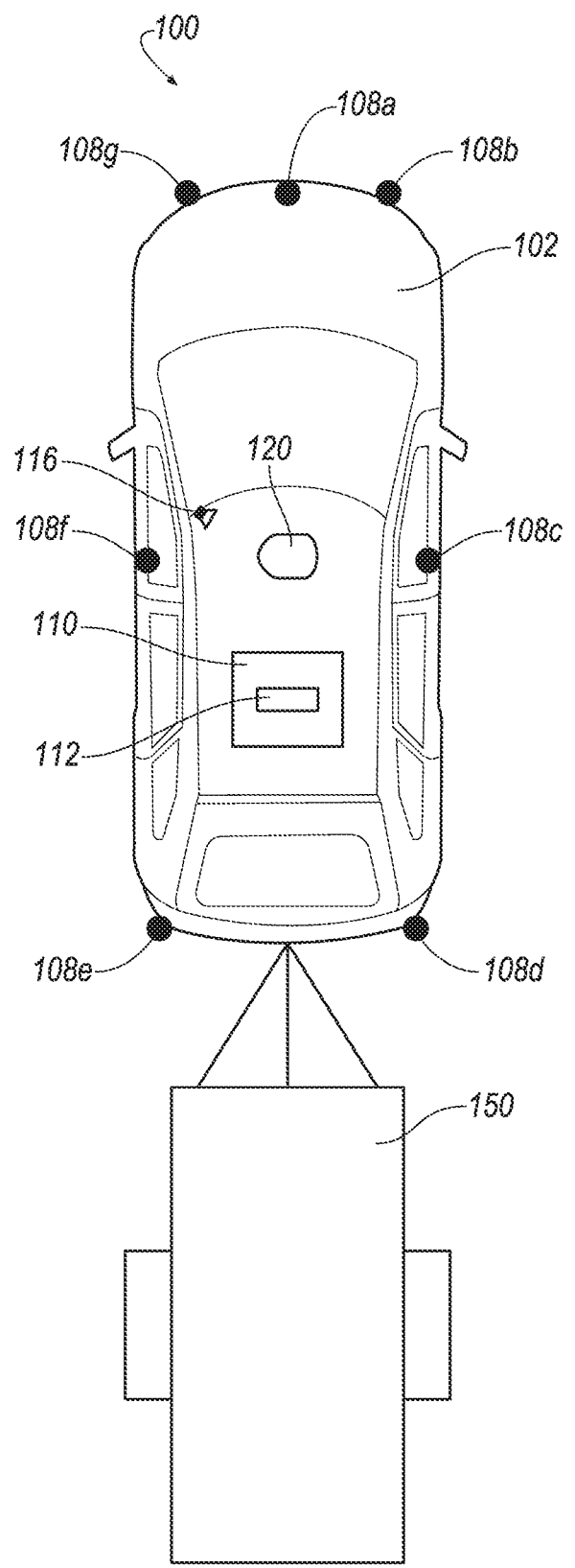
FIG. 1 is an example top view of vehicle trailer system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicle sensors may be used to determine the size and position of towable vehicles, such as trailers. Typically, these systems select the outermost target that corresponds to the trailer and estimates the trailer width based on these targets. These estimations may be used to other vehicle features, such as blind spot monitoring, lane departure warnings, etc. However, these sensors may detect items that are not trailers, such as guard rails, trees, other vehicles, etc. This may especially be the case when the towing vehicle is turning, or where a stationary object such as a wall or guardrail, or even a moving object whose relative speed is small at the nearside of the towing vehicle. Further, in order to sense the hitch angle during turning, other high-cost sensors are typically required.

Disclosed herein is a method and system for trailer size estimating and monitoring. The disclosed system uses existing sensors to estimate a trailer size, and provides for continuous monitoring, without a decrease in accuracy. The system may acquire trailer data from at least two rear vehicle sensors. The system may then generate a virtual grid and identify which cells of the grid the trailer is present in. The cells with the highest distribution of occupancy may be determined to create a template of the trailer, and therefore the trailer size may be generated based on the cells with the highest distribution. This distribution may be saved in a memory. Subsequent monitoring of the trailer may continue to occur. The distribution of this subsequent monitoring may be compared to the previous distribution. If the difference in distribution exceeds a predefined difference, then the system may issue an alert. The alert may include alerts such as lane deviation, trailer size violation, etc. The alert may also include sharing the difference in distribution with other vehicle ADAS such as Land Departure Warning, Lane Change Assist, etc.

FIG. 1 illustrates an example top view of a trailer system 100 including a trailer size application 110 within a vehicle 102. The system 100 may be an advanced driver assistance systems (ADAS). The trailer system 100 may include a plurality of sensors 108a-108g (collectively referred to as sensors 108). The sensors 108 may include various cameras, LIDAR sensors, radar sensors, ultrasonic sensors, or other sensors for detecting information about the surroundings of the vehicle, including, for example, other vehicles, lane lines, guard rails, objects in the roadway, buildings, pedestrians, etc. Each of the sensors 108 may be arranged at a location around the vehicle 102 to acquire data for a specific field of view.

The vehicle 102 may be configured to tow or pull a trailer 150, or other similar device. The trailer may be any type of trailer, such as an open bed trailer, a closed utility trailer, a camper, horse trailer, etc.

The sensors 108 may be in communication with the trailer size application 110. The trailer size application 110 may be included in a controller 112. The controller 112 may be a vehicle controller such as an electronic control unit (ECU). The controller 112 may be embodied in a processor configured to carry out instructions for the methods and systems described herein. The controller 112 may include a memory (not individually shown in FIG. 1), as well as other components specific processing within the vehicle. The controller 112 may be one or more computing devices such as a quad core processor for processing commands, such as a computer processor, microprocessor, or any other device, series of devices or other mechanisms capable of performing the operations discussed herein. The memory may store instructions and commands. The instructions may be in the form of software, firmware, computer code, or some combination thereof. The memory may be in any form of one or more data storage devices, such as volatile memory, non-volatile memory, electronic memory, magnetic memory, optical memory, or any other form of data storage device. In one example, the memory may include 2 GB DDR3, as well as other removable memory components such as a 128 GB micro SD card.

The sensors 108 may provide sensor data to the application 110. The application 110 may in turn use the data to generate certain vehicle features such as park assist features, blind spot detection features, birds eye view, etc. The sensors 108, especially the rear sensors 108d and 108e, may provide data regarding a trailer 150 or other type of apparatus following the vehicle 102. The application 110 may communicate with the sensors 108 via a wired or wireless communication. The application 110 may also communicate with other vehicle systems such as a vehicle display 120.

The vehicle display 120 may include a visual display within the vehicle center console. The display 120 may be a heads-up display, a dash board display, etc. The display 120 may display certain user interfaces and images related to the sensor data supplied to the controller 112. For example, the display 120 may display certain warnings or alerts related to the trailer 150, etc.

The vehicle 102 may also include a vehicle audio system 116. The vehicle audio system may include at least one microphone and at least one speaker. The speaker may be configured to email audio therefrom, such as from the vehicle's radio, user's phone, etc. The speaker may also provide an audible alert relating to the trailer 150.

The trailer application 110 may receive data from the sensors 108, specifically the rear sensors 108d, 108e. The rear sensors 108d, 108e may be arranged on the rear of the vehicle and may be capable of detecting objects behind or arranged adjacent the rear of the vehicle. In one example, the rear sensors 108d, 108e may be configured to detect the trailer 150. Specifically, the sensors 108d, 108e may be configured to provide trailer data to the controller 112 so that the controller 112 may determine the size of the trailer 150.

Figure 2C:
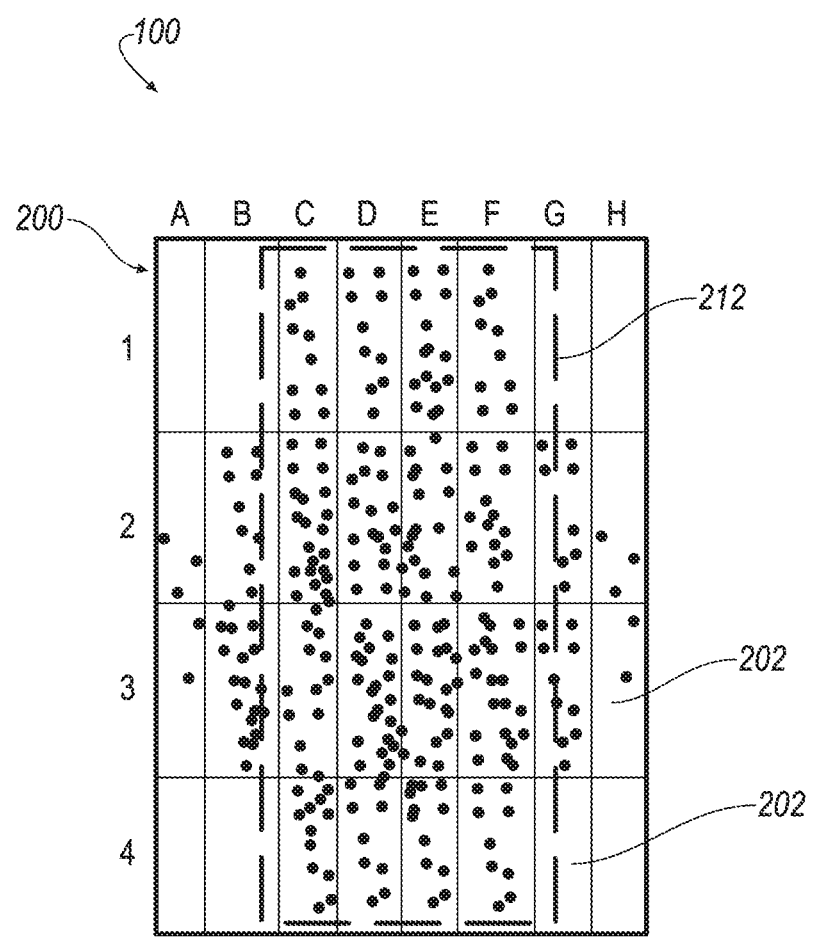
FIG. 2C illustrates an example occurrence frequency graph of the grid of FIGS. 2A and 2B.

FIGS. 2A-2C illustrate example top views of the trailer system 100 where the trailer 150 is arranged on a virtual grid 200. The grid 200 may include a plurality of parallel and spaced lines that cross each other to create a series of rectangular or square cells 202. In the example shown in FIGS. 2A-2C, at least 4 horizontal lines, and 6 vertical lines are shown, to create a total of 24 cells 202 within the grid 200. As shown in FIG. 2A, the trailer 150 may 'occupy', or cover at least a portion of a plurality of the cells 202. The grid 200 may be maintained by the controller 112 and more or less cells 202 may be present.

The controller 112 may maintain a database of the cells 202. The controller 112 may determine the location of the trailer 150 relative to the cells based on the trailer data provided by the rear sensors 108d, 108e. For example, the trailer data may indicate which of the cells 202 are currently 'occupied' by the trailer. The rear sensors 108d, 108e may be capable of determining the presence of an object, such as the trailer 150, and transmitting the data indicating the presence, such as the distance from the vehicle 102, etc., to the controller 112. The controller 112 may then in turn determine which cells 202 are occupied based on the distance. The controller 112 may establish the grid 200 to be arranged behind the vehicle 102 at a fixed location. Thus, as trailer data is received over time, the location of the cells 202 relative to the vehicle does not change.

In the example in FIG. 2A, cells B2-3, C1-3, D1-3, E1-3, F1-3 and G2-3 may all be occupied. This example may indicate the location of the trailer 150 when the vehicle 102 is parked or driving substantially straight.

In addition to determining a current trailer size 150, the controller 112 may define a permissible or valid trailer size. The valid trailer size may be that permissible by the local laws or regulations. The valid trailer size may be that defined by the vehicle towing specifications. An example valid trailer size 208 is illustrated in FIG. 2A. Anything exceeding this valid trailer size 208 may be considered an invalid trailer size and the controller 112 may present a warning to the driver.

FIG. 2B illustrates an example of the vehicle 102 and trailer 150 where the trailer 150 is arranged at an angle relative to the vehicle 102. This may be the case when the vehicle 102 is making a turn. When the vehicle 102 mays a turn, the rear sensors 108d, 108e may detect the trailer 150 to be offset from the original area detected in FIG. 2A. The sensors 108d, 108e may detect the trailer 150 to occupy cells A2-3.

During operation of the vehicle 102 and subsequent towing of the trailer 150, the rear sensors 108d, 108e may continually detect the presence of the trailer 150 behind the vehicle and send the trailer data to the controller 112. The controller 112 in turn may continually maintain a database of the occupancy of the trailer 150 relative to the cells. That is, the controller 112 may maintain the frequency at which the trailer 150 is occupying a certain cell by incrementing each time an object is detected in that cell. The cells with the highest frequency of occupancy may be determined to make up the estimated trailer. The estimated trailer may be defined by those cells 200 that have the highest frequency, or are occupied the most, during monitoring of the trailer 150 by the rear sensors 108d, 108e. Notably, the typical position of the trailer 150 may be directly behind the vehicle 102, as shown by way of example in FIG. 2A. Occasionally, during turning, the trailer 150 may occupy other cells that it typically would not during a straight driving route. When this occurs, the frequency for these cells (e.g., A2-3) will be increased in the database. Over a period of time, if this frequency continues to increase, then the controller 112 may determine that the vehicle 102 is no longer turning, but instead is deviating from the lane. In this situation, the controller 112 may issue an alert to the driver of the lane departure so that the driver may correct his or her driving.

FIG. 2C illustrates an example of a frequency count or incrementation of the occupancy of the cells during trailer monitoring. As illustrated, the cells B2-3, C1-4, D1-4, E1-4, F1-4, and G2-3 have a higher frequency of occupancy than the remaining cells. Cells A2-3 and H2-3 have some frequency over the remaining cells. Some cells may include a low occupancy frequency. This occupancy may be caused by the trailer turning. Additionally or alternatively, this frequency may be caused by an object unrelated to the trailer 150. These objects may be objects that are detected alongside and external to the vehicle such as trees, guard rails, etc. Under traditional trailer size detection systems, such object may cause trailer size estimations to be inaccurate.

The controller 112 may determine an estimated trailer size 212 by evaluating the range the distribution of the occupancy frequencies in each cell. The controller 112 may determine which cells have similar distribution of the occupancy frequencies. That is, which cells contain the most frequencies within a deviation of each other. In the example in FIG. 2C, cells B2-3, C1-4, D1-4, E1-4, F1-4, and G2-3 all have higher and similar frequencies. The remaining cells have frequencies that deviate greatly from these cells.

The controller 112 may set a threshold distribution. This threshold may change as the trailer data is collected. The more frequencies that are logged, the higher the threshold distribution. For example, the more trailer data that is collected, the more frequencies will be recognized in the various cells. These frequencies may indicate the trailer 150 occupying the same cells, which may drive the frequency of these cells up. However, as the vehicle 102 proceeds to drive and collect the trailer data, in addition to the trailer occupancy, the number of turns, as well as the number of exterior objects that may be erroneously detected may also increase. A lower threshold distribution may cause these erroneous samples to be included in the trailer size determination. Thus, as the amount of trailer data increases, as does the threshold distribution, to increase accuracy of the estimation.

If the controller 112 determines that the estimated trailer size exceeds the valid trailer size 208, the controller 112 may instruct the vehicle 102 to alert the user. This alert, as explained above, may come in the form of a visual alert via the display 120, and/or an audible alert via the audio system 116.

Figure 3:
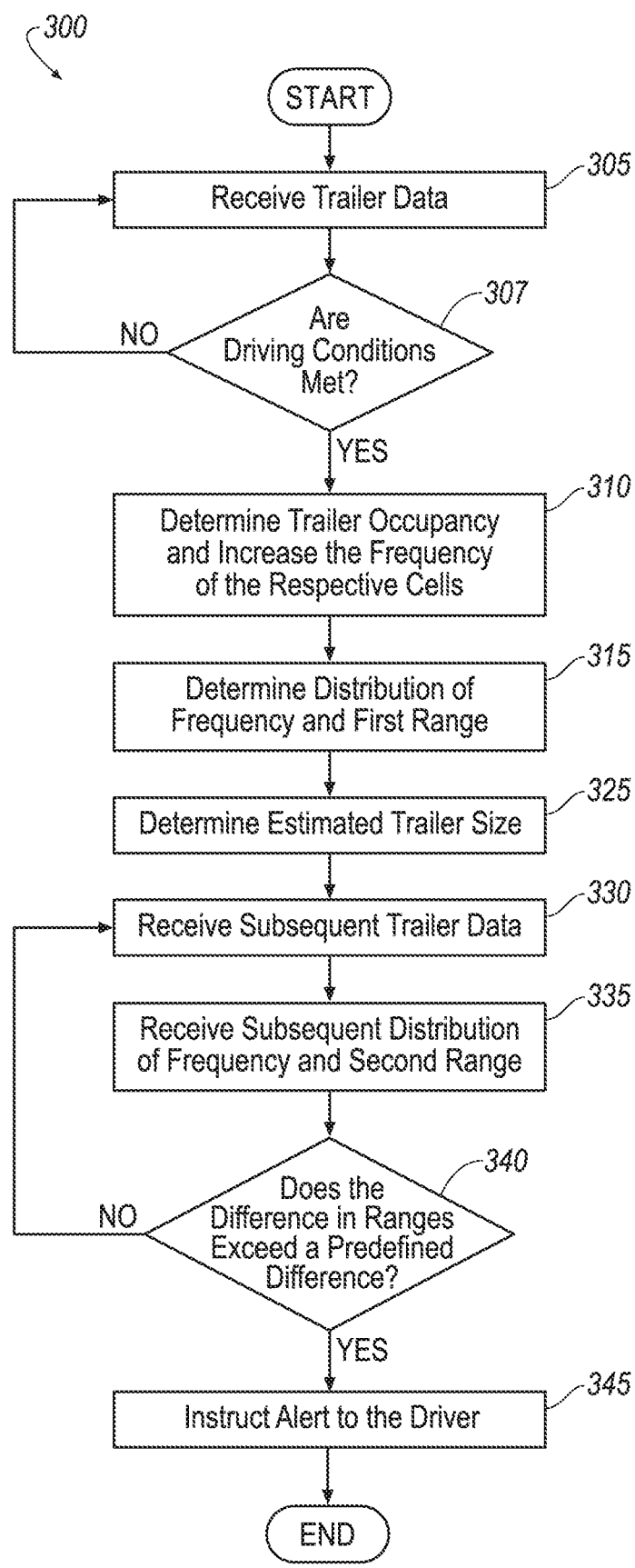
FIG. 3 illustrates an example process for the trailer system of FIG. 1.

FIG. 3 illustrates an example process 300 for the trailer system 100. The process 300 may begin at block 305 where the controller 112 may receive the trailer data. As explained above, the trailer data may include data from the rear sensors 108d, 108e. This data may indicate the presence and position/location of the trailer 150.

At block 307, the controller 112 may determine whether certain driving conditions are met. These driving conditions may include certain velocity, curvature, etc., and may ensure that the trailer data should be considered in the size determination. The conditions to determine whether to use and save the distribution information. For example, the sensors only detect trailer and/or estimate trailer size when the vehicle speed is great than 5 kph. In another example, the system may temporarily suspend occupancy data when the curvature is too small since the trailer will be out of the Field of View of sensor. If the driving conditions are met, the process 300 may proceed to block 310. Otherwise, the process 300 may return to block 315.

At block 310, the controller 112 may determine, based on the trailer data, which cells 202 of the virtual grid 200 the trailer 150 occupies. For each occupied cell, the occupancy frequency as maintained by the controller 112 is increased.

At block 315, the controller 112 may determine a threshold distribution based on the distribution of the frequencies. The threshold distribution may be a difference between the occupancy frequency of the cells having an occupancy frequency differing by a predefined high threshold and the occupancy frequency of the cells having a low occupancy frequency differing by a predefined low threshold. For example, the threshold distribution may be a difference between the occupancy frequency of the high occupancy cells (e.g., cells B2-3, C1-4, D1-4, E1-4, F1-4, and G2-3) and the low occupancy cells (e.g., cells A2-3 and H2-3, as well as cells A1, A4, B1, B4, G1, G4, H1, and H4 which have a zero frequency). As explained above, the more data, the higher the threshold distribution. For example, if a lower number of data has been collected, such as 10 samples, then the threshold distribution may be corresponding low, as for example, 2. Conversely, if a larger amount of data has been collected, such as 500 samples, then the threshold distribution may be correspondingly high, as for example, 25.

The distribution may be determined by determining the change in distribution by a percentage of the difference so that the threshold may be consistent. Additionally or alternatively, the controller 112 may detect a predefined number of objects or occupancies within a predefined amount of time. For example, the controller 112 may detect a maximum object number of 10 within 1 second (e.g., one system cycle). In this example, if 8 or more objects are detected in a cell, then that cell may be determined to have a 0.8 frequency rate. This may be considered a high frequency rate based on a high frequency threshold being set at 0.8 or above.

Once the distribution is established, the distribution may be evaluated over time to determine a stability, for example, as discussed in block 340.

The threshold distribution may then be used to determine a first range of the trailer. The first range may make up those cells having a frequency that exceeds the threshold distribution, or those having a high frequency rate.

At block 325, the controller 112 may determine the estimated trailer size based on the first range. That is, by determining which cells 202 have the highest frequency within the threshold distribution.

At block 330, the controller 112 may receive subsequent trailer data. The subsequent trailer data may be similar to the first trailer data in that the rear sensor 108d, 108e may provide trailer information to the controller 112.

At block 335, the controller 112 may determine a second or subsequent trailer range based on the subsequent trailer data. The subsequent range may be a distribution of the occupancy frequencies based on the newly received trailer data. That is, if the trailer data indicates a change in the occupancy of the cells 202, then the frequency distribution may also change. For example, over a predefined stability time threshold of 48 seconds, the controller 112 may determine whether occupancy part of the trailer, or simply noise caused by a guardrail, wall, etc. If the occupancy frequency is 0.8 or greater for a duration of 48 seconds, then the occupancy frequency may determine a change in the trailer size or an error.

At block 340, the controller 112 may determine whether the difference between the first range and the second range exceeds a predefined difference. For example, the predefined difference is a distribution of 0.2. By exceeding the predefined difference, the controller 112 may recognize a lane violation by the driver (e.g., the trailer 150 is continually crossing a lane). Additionally or alternatively, exceeding the predefined difference may indicate an invalid trailer size. If the difference exceeds the predefined difference, the process 300 proceeds to block 345. If not, the process 300 continues to monitor the trailer data provided by the rear sensors 108*d*, 108*e*.

At block 345, the controller 112 may instruct the vehicle 102 via the display 120 or audio system 116 to alert the driver of the change in threshold. The change in threshold may indicate an error in the estimated trailer size, an error in the data provided by the rear sensors 108*d*, 108*e*, etc.

Computing devices, such as the controllers processors, servers, sensors, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network and any one or more of a variety of manners. A file system may be accessible for a computer operating system, and make the files stored in various formats. An RDBMS generally employs the Structure Query Language (SQL) in addition to language for creating, storing, editing, and executing stored procedures, such as PL/SQL language mentioned above.

In some examples, system elements may be implemented as computer-readable instructions (e.g., software) on one or more computing devices (e.g., servers, personal computers, etc.) stored on computer readable media associated therewith (e.g., disks, memories, etc.). A computer program product may comprise such instructions stored in computer readable media for carrying out the functions described herein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle system for estimating a trailer size, comprising:
    a plurality of sensors arranged on a vehicle and configured to detect objects external to the vehicle and provide trailer data indicative of a trailer location behind a vehicle;
    a memory configured to maintain a virtual grid including a plurality of cells;
    a controller in communication with the sensors and memory and configured to:
    determine, based on the trailer data received within a predefined amount of time, an occupancy frequency for each of the plurality of cells, the occupancy frequency being an incrementation of each time an object is detected within the respective cell;
    determine a threshold distribution based on the occupancy frequency of each cell;
    determine a trailer size based on the cells having an occupancy frequency exceeding the threshold distribution;
    receive subsequent trailer data; and
    determine, based on the subsequent trailer data, a subsequent occupancy frequency for each cell over a subsequent period of time subsequent to the predefined amount of time.

2. The system of claim 1, wherein the threshold distribution is a difference between the occupancy frequency of the cells having an occupancy frequency exceeding a high occupancy frequency and the occupancy frequency of the cells having a low occupancy frequency less than the high threshold occupancy frequency.

3. The system of claim 1, wherein the controller is further configured to determine whether the difference between the occupancy frequency of the trailer data and the occupancy frequency of the subsequent trailer data exceeds a predefined difference.

4. The system of claim 3, wherein the controller is further configured to instruct an alert in response to the difference between the occupancy frequency of the trailer data and the occupancy frequency of the subsequent trailer data exceeding the predefined difference.

5. The system of claim 1, wherein the sensors include a pair of sensors arranged on each rear corner of the vehicle.

6. The system of claim 1, wherein the controller is further configured to maintain a valid trailer size, and compare the valid trailer size to the estimated trailer size.

7. A non-transitory computer-readable medium tangibly embodying computer readable instructions for a software program, the software program being executable by a processor of a computing device to provide operations comprising:
- receiving trailer data indicative of a trailer position behind a vehicle;
- generating a virtual grid having a plurality of cells, each having a periodically updated occupancy frequency based on the trailer data, the occupancy frequency being an incrementation of each time an object is detected within the respective cell;
- determining a threshold distribution between the occupancy frequencies of the cells based on the occupancy frequency of each cell;
- determine a trailer size based on the cells having an occupancy frequency exceeding the threshold distribution;
- receiving subsequent trailer data; and
- determining, based on the subsequent trailer data, a subsequent occupancy frequency for each cell.

8. The medium of claim 7, wherein the threshold distribution is a difference between the occupancy frequency of the cells having a high occupancy frequency and the occupancy frequency of the cells having a low occupancy frequency less than the high occupancy frequency.

9. The medium of claim 7, further comprising determining whether the difference between the occupancy frequency of the trailer data and the occupancy frequency of the subsequent trailer data exceeds a predefined difference.

10. The medium of claim 9, further comprising issuing an alert in response to the difference between the occupancy frequency of the trailer data and the occupancy frequency of the subsequent trailer data exceeding the predefined difference.

11. The medium of claim 7, wherein the trailer data is received from a pair of rear vehicle sensors.

12. The medium of claim 7, further comprising comparing a valid trailer size to the estimated trailer size.

13. A method for determining a trailer size, comprising:
- receiving trailer data indicative of a trailer position behind a vehicle;
- generating a virtual grid having a plurality of cells, each having a periodically updated occupancy frequency based on the trailer data;
- determining a threshold distribution between the occupancy frequencies of the cells based on the occupancy frequency of each cell, the occupancy frequency being an incrementation of each time an object is detected within the respective cell;
- determine a trailer size based on the cells having an occupancy frequency exceeding the threshold distribution;
- receiving subsequent trailer data; and
- determining, based on the subsequent trailer data, a subsequent occupancy frequency for each cell.

14. The method of claim 13, wherein the threshold distribution is a difference between the occupancy frequency of the cells having a high occupancy frequency and the occupancy frequency of the cells having a low occupancy frequency less than the high occupancy frequency.

15. The method of claim 13, further comprising determining whether the difference between the occupancy frequency of the trailer data and the occupancy frequency of the subsequent trailer data exceed a predefined difference.

16. The method of claim 15, further comprising issuing an alert in response to the difference between the occupancy frequency of the trailer data and the occupancy frequency of the subsequent trailer data exceeding the predefined difference.

17. The method of claim 7, further comprising comparing a valid trailer size to the estimated trailer size.

* * * * *